United States Patent

[11] 3,582,738

[72] Inventor Johannes G. A. Claassen
Eindhoven, Netherlands
[21] Appl. No. 770,362
[22] Filed Oct. 24, 1968
[45] Patented June 1, 1971
[73] Assignee Skil Corporation
Chicago, Ill.

[54] FEEDBACK SPEED CONTROL CIRCUIT FOR AN ELECTRIC MOTOR
1 Claim, 4 Drawing Figs.

[52] U.S. Cl. .................................................. 318/249,
318/345, 318/331
[51] Int. Cl. ..................................................... H02p 5/16
[50] Field of Search ........................................... 318/331,
345, 341, 249

[56] References Cited
UNITED STATES PATENTS

| | | | |
|---|---|---|---|
| 3,209,228 | 9/1965 | Gawron | 318/345 |
| 3,271,648 | 9/1966 | Weed | 318/345X |
| 3,443,189 | 5/1969 | Gilbreath | 318/345 |
| 3,474,319 | 10/1969 | Berlin | 318/331 |

Primary Examiner—Oris L. Rader
Assistant Examiner—Robert J. Hickey
Attorney—McDougall, Wersh & Scott ABSTRACT: A speed control circuit for a universal electric motor having series connected armature and field windings, wherein a controlled semiconductor, such as an SCR, is utilized. A circuit containing a fixed resistor and a variable resistor is connected to the supply voltage. The fixed resistor is connected in parallel with a capacitor and the armature windings forming a series circuit loop containing the fixed resistor, capacitor, and the armature windings wherein the back EMF generated in the armature windings affects the amount of voltage for charging the capacitor. The control electrode of the semiconductor is connected by a voltage triggered signal channel to the capacitor. A selected operating speed is obtained by adjustment of the variable resistor. In this control circuit the capacitor is charged during the positive half-cycle by a voltage (across the fixed resistor) which is a fraction of the supply voltage minus the back voltage generated in the armature windings until the triggering voltage for the signal channel is built up on the capacitor whereupon the signal channel will be made conductive to fire the semiconductor into a conductive state. Preferably a diode is connected in shunt relation with the field windings to provide controlled excitation of the field windings during the negative half-cycle so that a significant armature back voltage is generated in the armature windings.

INVENTOR
JOHANNES G. A. CLAASSEN

ATTORNEYS.

INVENTOR
JOHANNES G.A. CLAASSEN
BY Greist, Lockwood, Greenawalt + Dewey
ATTORNEYS 3,582,738

FEEDBACK SPEED CONTROL CIRCUIT FOR AN ELECTRIC MOTOR

BACKGROUND OF THE INVENTION

1. Field of the Invention

This invention relates to speed control circuits for electric motors, particularly universal electric motors having series connected armature and field windings. These motors can be operated from either an alternating current or direct current source.

The particular field of the subject invention is that of speed control circuits for maintaining a constant speed of operation for varying loads on the motor. By way of example, the field of invention includes speed control circuits for an electric grinder or rotary saw where it is desired to maintain a constant speed of rotation for varying loads upon the tool motor.

2. Description of the Prior Art

Heretofore, many types of speed control feedback circuits have been developed for controlling or maintaining the speed of an electric motor under varying load conditions. However, most of these prior art speed control circuits have not provided desirable low-speed characteristics, i.e. stable operation at low speeds as well as essentially zero start operation.

Feedback operation of a speed control circuit utilizing the armature back voltage or back EMF is well known in the prior art. In this regard, two types of prior art feedback circuits have long been utilized.

The first type of feedback circuit subtracts the back EMF from the supply voltage directly. Generally, in these circuits a controlled semiconductor, such as an SCR, is connected between the field windings and the armature windings. A capacitor in the circuit is charged by the supply voltage through a resistor which can be a variable resistor and this charging is controlled more or less rapidly by the back EMF generated in the armature windings, i.e., the resistor, capacitor and armature windings are connected in series across the supply voltage. The SCR is not conductive until a certain voltage is built up across the capacitor. With this circuit, the conduction angle for the "firing" or "turning on" of the SCR is a function of the supply voltage less the back EMF ($V=V$ supply $- V$ back EMF). When the armature is slowed down by a load on the armature shaft, a smaller back EMF is generated in the armature windings and the capacitor will charge more rapidly thereby "firing" the SCR into conduction at an earlier point in the positive half-cycle to feed more current to the field and armature windings.

The second type of feedback circuit known in the prior art provides a reference signal or voltage which is a function of the supply voltage and the circuit elements used. This reference voltage is not affected by the back EMF but is balanced against or compared to the back EMF. The charging rate of the capacitor is only affected by the resistance of the resistor which can be a variable resistor. The reference voltage then built up across the capacitor is compared to or balanced against the armature back voltage or back EMF through a series circuit which passes through the gate-cathode junction of the SCR. In other words, the voltage across the gate and cathode equals the reference voltage built up on the capacitor minus the armature back voltage or back EMF generated in the armature windings. The SCR is "triggered" or "fired" into a conducting state when the reference voltage or signal exceeds the back voltage or back EMF by the "firing" voltage. The variation of the reference voltage across the capacitor and the back voltage generated in the armature, with respect to the phase angle, is such that the conduction angle of the SCR is a function of the armature back voltage ($V$ fire $- V$ reference $- V$ back EMF).

These two types of speed control feedback circuits, although providing constant speed over varying loads, do not provide desirable low-speed characteristics, i.e. stability and good feedback at very low speeds and essentially zero start operation.

SUMMARY OF THE INVENTION

In order to obtain the desired operating characteristics, not available in the prior art type speed control feedback circuits, the present invention provides a feedback control circuit wherein the voltage used to charge the capacitor is effectively a fraction, $p$, of the supply voltage less the back voltage generated in the armature, $V=pV$ supply $- V$ back EMF. This circuit is similar to the first type of feedback circuit discussed above except for the important fact that the capacitor in the circuit of this invention is charged by a fraction of the supply voltage instead of the supply voltage itself. The advantage of this circuit arrangement is that the back EMF has a greater effect on the charging of the capacitor since the amount of supply voltage for charging the capacitor is effectively reduced whereas the amount of back EMF remains the same.

It is a general object of this invention to provide a speed control circuit for a universal electric motor utilizing armature back voltage feedback which has stable low-speed operation as well as essentially zero start operation.

It is also an object of this invention to provide a speed control circuit for a universal electric motor utilizing armature back voltage feedback wherein the variation in armature back voltage relative to the reference voltage for charging the capacitor is substantial so the armature back voltage has a greater effect on the charging of the capacitor.

It is a further object of this invention to provide a speed control circuit for an electric motor having circuit means including a capacitor, whereby the capacitor is charged during the positive half-cycle by a voltage which is a fraction of the line voltage minus the back voltage generated in the armature windings.

It is a still further object of this invention to provide a speed control circuit which includes a diode connected in shunt relationship with the field windings and having a polarity reversed with respect to that of the controlled semiconductor to provide controlled excitation of the field windings during the nonconducting period of the controlled semiconductor.

It is another object of the invention to provide a speed control circuit having switch means including a switch in the shunt connection of a diode with the field windings and sequential switch operating means for operating the switch means and switch whereby the shunt connection of the diode with the field windings is opened prior to establishing a bypass connection to operate the motor under full cycle alternating current.

These and other objects and advantages of the invention will become apparent from the following description of the preferred embodiments taken in conjunction with the accompanying drawings.

DESCRIPTION OF THE PREFERRED EMBODIMENTS

Figure 1:
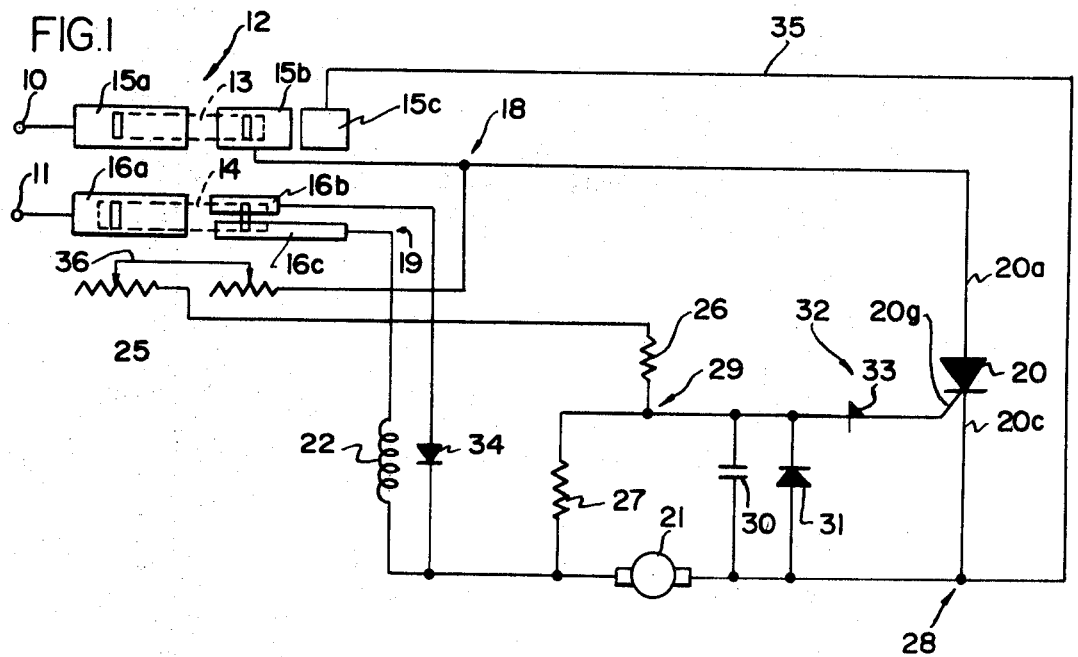
FIG. 1 is a schematic drawing of one form of the speed control circuit of this invention.

Referring to FIG. 1, the input terminals of the speed control circuit, adapted for connection to a source of alternating current, are indicated at 10 and 11. A sequential switch means is generally indicated at 12 and comprises movable or sliding contacts 13 and 14 and stationary contacts 15a, 15b and 15c and 16a, 16b and 16c. As the sliding contacts 13 and 14 are moved from left to right, sliding contact 13 will bridge or connect stationary contacts 15a and 15b while sliding contact 14 will connect or bridge stationary contact 16a with stationary contacts 16b and 16c. This will result in the application of voltage to points 18 and 19.

A first circuit means is connected with points 18 and 19 and includes a controlled solid-state semiconductor 20, such as a Silicon Controlled Rectifier, armature windings 21 and field windings 22. A second circuit means is also connected with points 18 and 19 and includes a variable resistor 25, a first fixed resistor 26 and a second fixed resistor 27. The junction between the semiconductor 20 and the armature windings 21 is indicated as point 28 and the junction between first fixed resistor 26 and second fixed resistor 27 as indicated as point 29. A capacitor 30 is connected between points 28 and 29. A diode 31 is also connected between points 28 and 29.

The anode of the semiconductor 20 is indicated at 20a while the cathode is indicated at 20c. The gate or control electrode of the semiconductor is indicated at 20g. A voltage triggered signal channel 32 connects the gate 20g with point 29. This signal channel may include any suitable triggering device, such as a trigger diode 33.

A diode 34 is connected in shunt relationship with field winding 22 through stationary contact 16b. A bypass line 35 connects contact 15c with point 28.

Movement of sliding contacts 13 and 14 (to the right in FIG. 1) will result in sliding contact 14 sliding off of stationary contact 16b to open the shunt circuit of the diode 34 across field windings 22. However, since stationary contact 16c is longer than stationary contact 16b, there will still be electrical contact between stationary contacts 16a and 16c through sliding contact 14. Also, after sliding contact 14 disengages from stationary contact 16b, sliding contact 13 will come into contact with the stationary contact 15c. In this position the speed control circuit will be bypassed and current will then flow from terminal 10 as follows: stationary contact 15a, sliding contact 13, stationary contact 15c, line 35, armature windings 21, field windings 22, contact 16c, sliding contact 14, and stationary contact 16a to second terminal 11. If desired, sliding contacts 13 and 14 can be mechanically connected with the sliding contact 36 of variable resistor 25 whereby movement of a single operating member, such as a tool trigger, can control the contacts 13 and 14 and also cause variation in the resistance of resistor 25. The desired operating speed can be adjusted by varying the resistance of resistor 25.

When the sequential switch means 12 is open, the contacts 13 and 14 engage only stationary contacts 15a and 16a, respectively. As the sliding switch contacts 13 and 14 are moved to start the motor, an electrical path is made between contacts 16a and 16b through sliding contact 14. This path is made to ensure that the diode 34 is included in the circuit before line power is applied to the circuit through contacts 15b and 16b so negative half-cycle current will flow through the diode 34 and not field windings 22. The circuit operates as a speed control circuit when contact is made between stationary contacts 15a and 15b through sliding contact 13 and between 16a and 16b and 16c through sliding contact 14. When the sliding contacts 13 and 14 are moved the maximum distance to the right (FIG. 1) contact between contacts 14 and 16b is broken before contact between contacts 13 and 15c is made. This ensures that current will flow through field windings 22 and not through diode 34 to contact 15c. Full cycle current operation is obtained when contact is made from 15a and 15c through sliding contact 13 and from contact 16a and 16c through sliding contact 14.

When the switch means 12 is positioned so that contact is made between 15a and 15b through sliding contact 13 and between 16a, 16b and 16c through sliding contact 14, the circuit operates in a manner which increases or decreases the angle of conduction of semiconductor 20 as the motor is loaded or unloaded, respectively, thereby maintaining the selected operating speed which is established by the variable resistor 25.

The current to the motor is controlled by the voltage triggered signal channel 32. When the signal channel 32 is made conductive by the establishment of a certain voltage potential between points 28 and 29, some of the energy stored in capacitor 30 passes through the signal channel 32 to the gate 20g firing the semiconductor 20 into a conductive state so current will flow through the motor windings 21 and 22. To develop sufficient voltage between points 28 and 29 to make signal channel 32 conductive, capacitor 30 is charged through resistors 25 and 26. Variation of the resistance of resistor 25 results in a more or less rapid charging of the capacitor which results in a larger or smaller conduction angle.

It will be appreciated that when the circuit is first energized as electrical path is provided through variable resistor 25, fixed resistors 26 and 27 and field windings 22. Also there is an electrical path through variable resistor 25, fixed resistor 26, capacitor 30, armature windings 21, and field windings 22. Since capacitor 30 will act as a easier path circuit until it is charged to the reference voltage across resistor 27, the major flow of current will be through variable resistor 25, fixed resistor 26 and capacitor 30 until such time as the voltage across the capacitor 30 reaches the voltage needed to make the signal channel 32 conductive to pass current through the gate-cathode circuit of the semiconductor 20 to "fire" the same into a conducting state. Then the major current will be through semiconductor 20, armature windings 21 and field windings 22. This sequence of events will take place only during the positive half-cycle and the semiconductor 20 will be "shut off," i.e. return to the blocking state when the supply voltage goes from the positive to the negative polarity. Then the semiconductor 20 will shut off. During the negative half-cycle current can flow through diode 34, armature windings 21, diode 31, fixed resistor 26 and variable resistor 25. By positioning diode 31 between points 28 and 29 the capacitor is prevented from being charged negatively during the negative half-cycle. When the positive half-cycle is again reached, this sequence of operation of the circuit will repeat itself.

Looking now at the circuit loop containing armature windings 21, capacitor 30 and resistor 27, it will be appreciated that the capacitor 30 will be charged by a voltage which is equal to the voltage drop across resistor 27 minus the armature back voltage or back EMF generated in armature windings 21. The back voltage of the armature windings 21 is a function of the speed of rotation of the armature and the strength of the magnetic flux through the field poles. The strength of the magnetic flux is controlled by the residual magnetism in the field poles and the amount of current flowing through field windings 22.

As load is imposed upon the motor, i.e. upon the rotating shaft of the armature, the armature will slow down. This will result in a decrease in the back armature voltage generated in the armature windings. With a decrease in voltage across the armature windings and with the voltage drop across resistor 27 remaining the same, the amount of voltage available for charging the capacitor is increased. The capacitor now will be charged more quickly and the signal channel 32 will be made conductive sooner, resulting in an earlier firing angle and larger conduction angle for the semiconductor 20 during the positive half-cycle. This will cause a greater pulse of current to flow through the armature windings 21 and field windings 22 during each positive half-cycle.

Stated differently, the armature back voltage or back EMF of the armature is used as a feedback signal to control the conduction angle. As the armature rotates it developes a back voltage at the brushes of the motor with the polarity being the same as the voltage applied during semiconductor conduction. This voltage prevents the capacitor from charging until the voltage across resistor 27 is sufficient to overcome the effect of this back voltage. The back voltage also acts during the charging of the capacitor to decrease the rate of charging up to the firing voltage of the signal channel 32. As the motor is put under a load the generated back voltage is reduced because of the reduced rotational speed. Since this voltage is reduced, the capacitor 30 charges to the firing voltage sooner resulting in a greater conduction angle and therefor more power to the motor. This greater power to the motor maintains the desired speed of the motor. When the load is decreased, the motor tends to increase its speed thereby increasing the back armature voltage which will result in decreasing the firing angle for maintaining the speed of the motor essentially constant.

For the circuit to be effective the back voltage of the armature must be of a magnitude which is significant with respect to the voltage developed across the capacitor 30 during the charging thereof. Otherwise the back voltage could not quickly or effectively change the "firing" of the signal channel 32, and any variations in the back voltage generated in the armature windings 21 due to a change in speed would have only a minimum of effect.

To achieve a relatively high level of back voltage, diode 34 is placed across the field windings 22. This diode maintains a current flow in the field windings during the period when the semiconductor 20 is nonconducting. This current flowing in the field windings 22 maintains a magnetic field across the field poles resulting in the generation of a high-back voltage (see curve e of FIG. 4).

Figure 2:
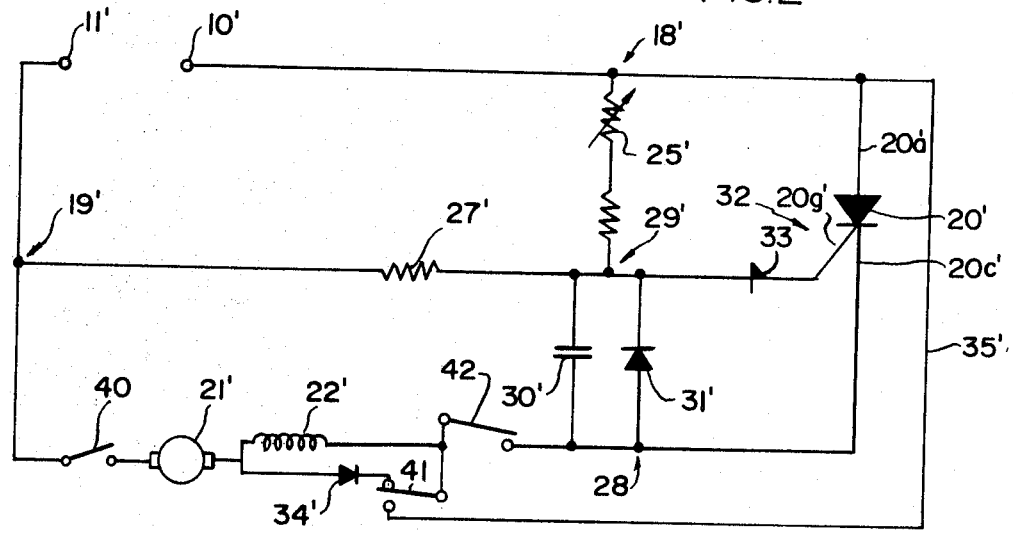
FIG. 2 is a schematic drawing of a second form of speed control circuit of this invention, the sequential switch means not being shown.
Figure 3:
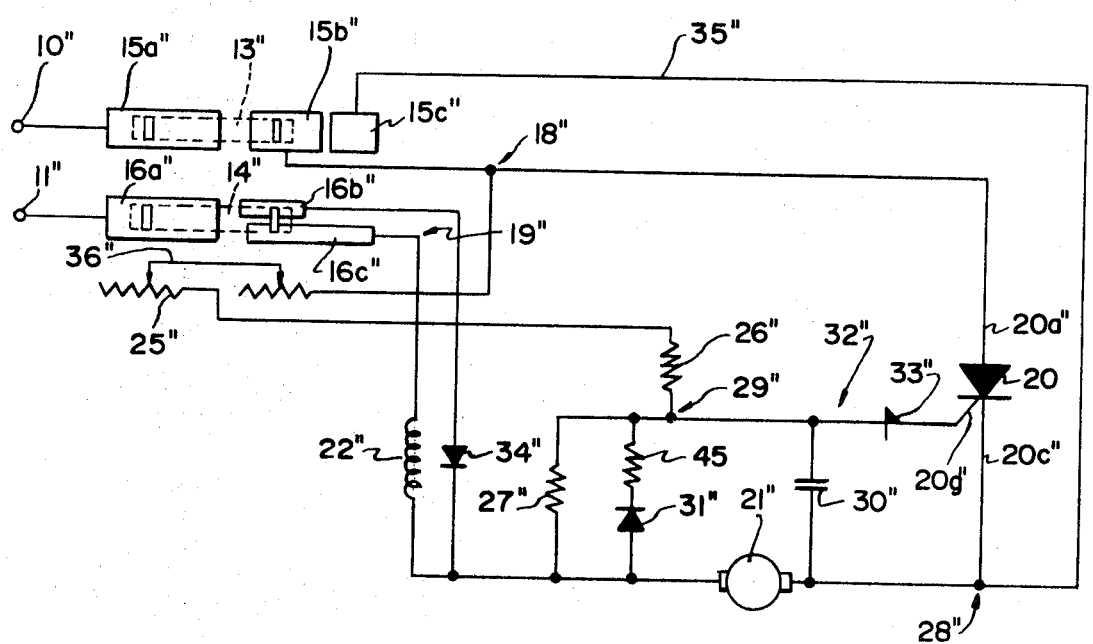
FIG. 3 is a schematic drawing of still another form of speed control circuit of this invention.

In the circuits shown in FIGS. 1, 2 and 3, like reference numerals indicate like circuit components except that in FIG. 2 the reference numerals have been given "primes" and in FIG. 3 they have been given double "primes."

The circuit in FIG. 2 is similar to the circuit in FIG. 1 except resistor 27' is connected directly to point 19'. The sequential switch means has been omitted from the FIG. 2 circuit but could easily be connected into this circuit in place of switches 40, 41 and 42 shown diagrammatically.

In FIG. 2, resistor 27' is connected between points 29' and 19' whereas in FIG. 1 resistor 27 is connected between point 29 and the junction between the field and armature windings. The only difference here is that the voltage drop across resistor 27' will be larger since the voltage drop across the field windings is not included in series with the second circuit means as in FIG. 1. In this circuit the voltage drop across field windings 22' is included in the series circuit loop containing capacitor 30', armature windings 21' and resistor 27'. This slight change is compensated for by the increased voltage drop across resistor 27' and if necessary by varying the resistance of resistor 25'.

An advantage to the circuit in FIG. 2 is the elimination of the connection of resistor 27 to the junction between the armature and field windings, i.e. an internal connection is eliminated. This simplifies the connection of the speed control circuit to the motor circuit.

Referring to FIG. 3, diode 31'' is connected in series with a resistor 45 and then both diode 31'' and resistor 45 are connected across or in shunt relationship with resistor 27''.

The operation of the circuit shown in FIG. 3 is similar to the operation of the circuit shown in FIG. 1. One exception is that the charging of the capacitor 30'' through the positive firing voltage is delayed by placing a negative charge on the capacitor 30'' (see curve b in FIG. 4). This negative charge is placed on the capacitor through resistor 45 and diode 31'' and is greater for a higher armature speed. If the speed is reduced by an applied load, the negative charge on the capacitor 30'' will be less. This will cause the capacitor to charge to the firing voltage sooner to supply more power to the motor tending to maintain the desired operating speed.

Figure 4:
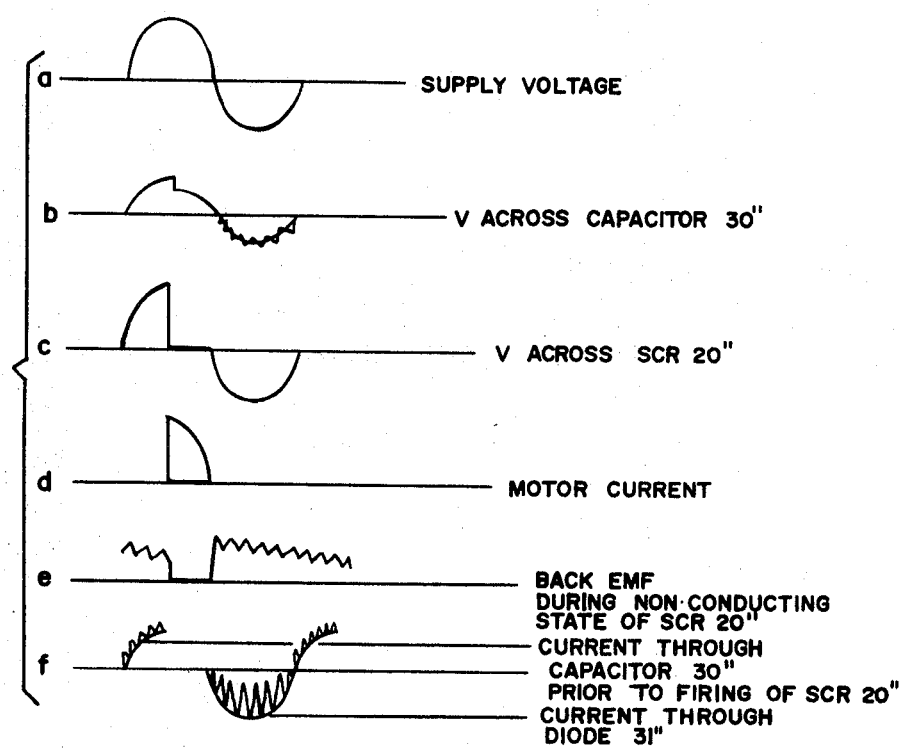
FIG. 4 is a series of graphs showing waveforms of voltages across and currents through various elements of the circuit illustrated in FIG. 3.

In the circuit of FIG. 3 diode 31'', resistor 45, and capacitor 30'' provide a path through which the back EMF current generated in armature windings 21'' during the negative half-cycle can flow to charge capacitor 30'' negatively, i.e. to charge capacitor 30'' with a voltage polarity which makes point 28'' positive with respect to point 29''. Some back EMF current will also flow through resistor 27''. This flow of current through capacitor 30'' is opposite to the conducting polarity of diode 31''. However, during the negative half-cycle there is a greater main current flow through diode 34'', diode 31'', resistor 45, resistor 26'' and resistor 25''. The back armature current generated in the armature windings 21'' for charging capacitor 30'' negatively is actually superimposed on (or modulates) the main negative half-cycle current from the alternating current source. Referring to FIG. 4, curve f shows the main current through diode 31'' and the superimposed current for charging capacitor 30'' negatively.

Resistor 45 is only needed to limit the current when the semiconductor 20'' is being bypassed. This current would result from a high armature voltage across armature windings 21'' and would flow through diode 31''', resistor 45, signal channel 32'', gate 20g''', cathode 20c'' and back to the armature windings 21''.

It will be appreciated that an important feature of this invention is the series circuit loop containing resistor 27, 27' or 27'', capacitor 30, 30' or 30'', and armature windings 21, 21' or 21'' whereby the capacitor 30, 30' or 30'' can be charged by a voltage (across resistor 27, 27' or 27'') which is only a fraction of the supply voltage across terminals 10, 10' or 10'' and 11, 11' or 11'' minus the armature back voltage generated in the armature windings 21, 21' or 21''. The second circuit means comprising resistors 25, 25' or 25''; 26, 26' or 26''; and 27, 27' or 27'' acts as a potential divider with the reference voltage appearing across resistor 27, 27' or 27''. In this series circuit loop changes in the armature back voltage have a significant effect on the charging of the capacitor 30, 30' or 30''.

The advantages of the circuits illustrated in FIGS. 1—3 are as follows:

1. The elements comprising the control circuit are small because of low dissipation and therefore the size of the overall control is small and can fit in a compact package either within a power tool or for ready connection to a power tool.
2. The circuit provides for full cycle operation.
3. The circuit provides zero start capability.
4. The circuit provides good low-speed and high-speed operation or regulation.
5. The circuit provides a good feedback at low speeds.

It is to be appreciated, of course, that the above-described circuits could be duplicated to provide full wave (as opposed to half-wave) operation with a few minor changes to the circuits.

While several embodiments of the invention have been shown and described other forms will be apparent to those skilled in the art. Therefore, it is not intended to limit the invention to the specific embodiments shown, it being understood that variations may be made from these specific embodiments provided they are within the scope of the invention as defined in the following claims.

I claim:

1. A speed control circuit for an electric motor having series connected armature and field windings, comprising: a pair of terminals for connection to a source of alternating current, first circuit means connected with said terminals and including a controlled solid-state semiconductor in series with said armature and field windings, second circuit means connected with said terminals and including a variable resistor in series with at least one fixed resistor, a capacitor connected at one end to said first circuit means between said controlled semiconductor and said windings of said electric motor and connected at the other end to said second circuit means between said fixed resistor and said variable resistor, said controlled semiconductor having a control electrode, and a voltage triggered signal channel connected between said control electrode and said other end of said capacitor, whereby said capacitor is charged during the positive half-cycle by a voltage which is a fraction of the line voltage minus the back voltage generated in said armature windings, until the triggering voltage for the signal channel is reached to open the signal channel and fire the semiconductor to feed source current to the motor windings, third circuit means connected in circuit with said terminals and including said armature and field windings in series with first switch means whereby upon closing of said switch means, the speed control circuit is bypassed and the electric motor is operated with full cycle current, a diode is connected in shunt with said field windings and has its polarity reversed with respect to that of said controlled semiconductor to provide controlled excitation of the field windings during the nonconducting periods of said controlled semiconductor, said first switch means includes second switch means in the shunt connection of the diode with said field windings and sequential switch operating means are provided for said first and second switch means whereby the shunt connection of the diode with the field windings is opened prior to establishing said bypass.